US010287865B2

(12) United States Patent
Brannon et al.

(10) Patent No.: US 10,287,865 B2
(45) Date of Patent: May 14, 2019

(54) USE OF AN ACID SOLUBLE OR DEGRADABLE SOLID PARTICULATE AND AN ACID LIBERATING OR ACID GENERATING COMPOSITE IN THE STIMULATION OF A SUBTERRANEAN FORMATION

(71) Applicant: Baker Hughes, a GE company, LLC, Houston, TX (US)

(72) Inventors: Harold Dean Brannon, Magnolia, TX (US); Stephen Jan Szymzak, Spring, TX (US); D.V. Satyanarayana Gupta, The Woodlands, TX (US); Charles Elmer Bell, Rockwall, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 558 days.

(21) Appl. No.: 14/713,694

(22) Filed: May 15, 2015

(65) Prior Publication Data
US 2015/0330197 A1 Nov. 19, 2015

Related U.S. Application Data

(60) Provisional application No. 62/000,052, filed on May 19, 2014.

(51) Int. Cl.
*C09K 8/70* (2006.01)
*C09K 8/516* (2006.01)
*C09K 8/72* (2006.01)
*E21B 43/25* (2006.01)
*E21B 43/16* (2006.01)
*C09K 8/60* (2006.01)
*C09K 8/92* (2006.01)

(52) U.S. Cl.
CPC .............. *E21B 43/25* (2013.01); *C09K 8/516* (2013.01); *C09K 8/60* (2013.01); *C09K 8/70* (2013.01); *C09K 8/72* (2013.01); *C09K 8/92* (2013.01); *E21B 43/16* (2013.01); *C09K 2208/08* (2013.01)

(58) Field of Classification Search
CPC . C09K 8/516; C09K 8/60; C09K 8/70; C09K 8/72; C09K 8/92; E21B 43/25; E21B 43/16
See application file for complete search history.

(56) References Cited

U.S. PATENT DOCUMENTS

| 3,481,401 A | 12/1969 | Graham |
| 3,828,854 A | 8/1974 | Templeton et al. |
| 4,261,421 A * | 4/1981 | Watanabe ............ C09K 8/5045 166/281 |
| 5,226,479 A | 7/1993 | Gupta et al. |
| 5,529,125 A | 6/1996 | Di Lullo Arias et al. |
| 5,964,291 A | 10/1999 | Bourne et al. |
| 6,330,916 B1 | 12/2001 | Rickards et al. |
| 6,793,018 B2 | 9/2004 | Dawson et al. |
| 6,995,120 B2 | 2/2006 | Crossman et al. |
| 7,059,414 B2 | 6/2006 | Rae et al. |
| 7,115,546 B2 | 10/2006 | Qu et al. |
| 7,144,844 B2 | 12/2006 | Qu et al. |
| 7,303,018 B2 | 12/2007 | Cawiezel et al. |
| 7,427,582 B2 | 9/2008 | Ballard et al. |
| 7,427,584 B2 | 9/2008 | Frenier et al. |
| 7,482,311 B2 | 1/2009 | Willberg et al. |
| 7,491,682 B2 * | 2/2009 | Gupta ..................... C09K 8/516 166/270 |
| 7,493,955 B2 * | 2/2009 | Gupta ..................... C09K 8/516 166/279 |
| 7,637,320 B2 | 12/2009 | Howard et al. |
| 7,642,223 B2 * | 1/2010 | Santra ..................... C09K 8/516 166/281 |
| 7,775,278 B2 * | 8/2010 | Willberg ................ C09K 8/508 166/280.1 |
| 7,795,186 B2 | 9/2010 | Saini et al. |
| 7,798,228 B2 | 9/2010 | De Benedictis et al. |
| 7,886,822 B2 | 2/2011 | De Victoria et al. |
| 7,950,462 B2 | 5/2011 | Xiao et al. |
| 7,977,283 B2 | 7/2011 | Gupta et al. |
| 7,998,908 B2 | 8/2011 | Rimassa et al. |
| 7,998,910 B2 | 8/2011 | Todd |
| 8,061,424 B2 | 11/2011 | Willberg et al. |
| 8,109,335 B2 | 2/2012 | Luo et al. |
| 8,183,179 B2 | 5/2012 | De Victoria et al. |
| 8,205,623 B2 | 6/2012 | Murzynski |
| 8,230,936 B2 * | 7/2012 | Davies .................. C09K 8/516 166/179 |
| 8,664,168 B2 * | 3/2014 | Steiner .................. C09K 8/536 166/278 |
| 8,714,256 B2 * | 5/2014 | Cochran ................. E21B 33/10 166/305.1 |
| 9,010,430 B2 | 4/2015 | Darby et al. |
| 9,029,300 B2 | 5/2015 | Gupta |
| 9,120,963 B2 * | 9/2015 | Willberg ................ C09K 8/035 |
| 9,441,447 B2 * | 9/2016 | Cochran ................. E21B 33/12 |
| 2005/0113263 A1 | 5/2005 | Brown et al. |
| 2005/0137095 A1 | 6/2005 | Cawiezel et al. |
| 2006/0032633 A1 * | 2/2006 | Nguyen .................. C09K 8/68 166/280.2 |
| 2006/0035790 A1 | 2/2006 | Okell et al. |
| 2006/0073980 A1 | 4/2006 | Brannon et al. |
| 2006/0084580 A1 * | 4/2006 | Santra .................... C09K 8/516 507/239 |

(Continued)

FOREIGN PATENT DOCUMENTS

WO 2011021043 A1 2/2011
WO 2012044986 A2 4/2012

Primary Examiner — Zakiya W Bates
Assistant Examiner — Crystal J Miller
(74) Attorney, Agent, or Firm — John Wilson Jones; Jones Delflache LLP

(57) ABSTRACT

The flow of a stimulation fluid may be diverted from a high permeability zone to a low permeability portion of a subterranean formation by use of an acid soluble or acid degradable solid particulate and a composite of an acid or an acid generating compound adsorbed onto a water-insoluble adsorbent. Conductive flow of hydrocarbons from an occluded fracture may be resumed by release of the acid from the adsorbent or the acid generating compound.

23 Claims, No Drawings

(56) References Cited

U.S. PATENT DOCUMENTS

| | | | |
|---|---|---|---|
| 2006/0124301 A1* | 6/2006 | Gupta | C09K 8/516 166/279 |
| 2006/0124302 A1* | 6/2006 | Gupta | C09K 8/516 166/279 |
| 2006/0131022 A1 | 6/2006 | Rae et al. | |
| 2006/0175059 A1 | 8/2006 | Sinclair et al. | |
| 2007/0044966 A1* | 3/2007 | Davies | E21B 33/1208 166/287 |
| 2008/0108524 A1* | 5/2008 | Willberg | C09K 8/035 507/225 |
| 2008/0182761 A1 | 7/2008 | Stephenson et al. | |
| 2008/0200352 A1* | 8/2008 | Willberg | C09K 8/508 507/219 |
| 2012/0043085 A1* | 2/2012 | Willberg | C09K 8/665 166/308.1 |
| 2012/0073812 A1* | 3/2012 | Cochran | E21B 33/1208 166/283 |
| 2012/0181035 A1 | 7/2012 | Mang | |
| 2012/0190593 A1 | 7/2012 | Soane et al. | |
| 2012/0252706 A1* | 10/2012 | Steiner | C09K 8/536 507/204 |
| 2013/0025860 A1* | 1/2013 | Robb | C09K 8/035 166/279 |
| 2013/0126158 A1 | 5/2013 | Gupta et al. | |
| 2013/0233546 A1* | 9/2013 | Liang | C09K 8/035 166/285 |
| 2015/0000911 A1* | 1/2015 | Cochran | E21B 33/1208 166/290 |
| 2015/0075792 A1 | 3/2015 | Brandl et al. | |
| 2015/0198010 A1 | 7/2015 | Doan et al. | |
| 2016/0009980 A1 | 1/2016 | Gupta et al. | |
| 2016/0030916 A1 | 2/2016 | Shen et al. | |
| 2017/0198210 A1 | 7/2017 | Gupta | |

\* cited by examiner

USE OF AN ACID SOLUBLE OR DEGRADABLE SOLID PARTICULATE AND AN ACID LIBERATING OR ACID GENERATING COMPOSITE IN THE STIMULATION OF A SUBTERRANEAN FORMATION

This application claims the benefit of U.S. patent application Ser. No. 62/000,052, filed on May 19, 2014, herein incorporated by reference.

SPECIFICATION

Field of the Disclosure

The disclosure relates to the use of an acid soluble or acid degradable solid particulate and an acid liberating or an acid generating composite having a water-insoluble adsorbent in the stimulation of a subterranean formation. The combination of the particulate and composite is effective in re-directing stimulation fluids from high permeability zones to low permeability zones.

Background of the Disclosure

Well treatment fluids are routinely used in stimulation operations to enhance the recovery of hydrocarbons from subterranean formations. Such operations include acidizing and hydraulic fracturing. Much interest has been focused on methods for improving downhole placement of well treatment fluids during stimulation operations in order to create highly conductive channels over large areas.

The treatment design of a hydraulic fracturing operation for a conventional reservoir generally requires fracturing fluid to reach maximum viscosity as it enters the fracture. A long primary bi-wing fracture is typically created perpendicular to the minimum stress orientation. Pumping of fracturing fluid into the wellbore usually just extends the planar or primary fracture; secondary fractures near the wellbore are limited. Fracturing treatments which create predominately long planar fractures are characterized by a low contacted fracture face surface area, i.e., low stimulated reservoir volume (SRV).

Low viscosity fluids known as slickwater are often used in the stimulation of low permeability formations, including tight gas reservoirs, such as shale formations. Such reservoirs are typically characterized by a permeability less than or equal to 1.0 mD and exhibit a complex natural fracture network. To effectively access tight formations, wells are often drilled horizontally and then subjected to one or more fracture treatments to stimulate production. Fractures propagated with low viscosity fluids exhibit smaller fracture widths than those propagated with higher viscosity fluids. While fracture SRV and complexity is increased, secondary fractures created by the operation are near to the wellbore. Slickwater fracturing is generally considered to be inefficient in the opening or creation of complex network of fractures farther away from the wellbore. Thus, while SRV is increased in slickwater fracturing, production is high only initially and then drops rapidly to a lower sustained production since there is little access to hydrocarbons far field from the wellbore.

Recovery of entrapped oil or gas can be accelerated by increasing the effective wellbore area within the formation. In the past, methods have been developed to divert the flow of treatment fluids from the higher permeability sections of the formation to the lower permeability sections. For instance, chemical diverting agents have been used to temporarily block the high permeability intervals within the formation and divert stimulation fluids into the desired low permeability intervals by increasing flow resistance inside the created channels. It is desirable for these agents to be stable at the bottomhole temperature and also to be removable from the formation rapidly after the treatment in order to eliminate any potential damage to the high permeability intervals.

Representative chemical diverting agents used in the past are viscous gels or foams such as blends of viscoelastic surfactants and/or polymer based gels such as hydroxyethylcellulose (HEC) and hydropropyl guar gum. Polymer based gels often result in formation damage caused by polymeric residue while viscoelastic surfactants often cannot discriminate between zones with various permeabilities. Further, temperature limitations for such systems are generally around 200° F. Other chemical diverters used in the past have failed to control the flow of fluid used in acidizing operations. Oil-soluble naphthalenes, crushed limestone, sodium tetraborate, oyster shells, gilsonite, perilite and paraformaldehyde have also been reported for use as chemical diverters. Such materials have been shown to be only useful in wells having a bottom hole temperature of 175° F. or less.

Chemical diverters have also focused on materials which are acid soluble. For instance, solid organic acid flakes, such as polylactic acid flakes, have been reported to be useful for acid diversion. While such materials hydrolyze to release acid, a high volume of water is required to completely hydrolyze the material and to ensure full conversion of the solid materials into acid. Failure to remove the solids causes formation damage.

Alternatives have therefore been sought for diverting agents which are suitable for use at high bottom hole temperatures and which do not cause formation damage.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a method of stimulating a subterranean formation is disclosed. In this method, an acid soluble or acid degradable solid particulate and an acid liberating or acid generating composite comprising a water-insoluble adsorbent are pumped into a well penetrating the subterranean formation. The acid soluble or acid degradable solid particulate has a sized particle distribution sufficient to block a high permeability zone of the formation. The composite contains an acid adsorbed onto the water-insoluble adsorbent. Alternatively, a compound which generates an acid may be adsorbed onto the water-insoluble adsorbent. The flow of the stimulation fluid is diverted to a low permeability portion of the formation. The solid particulate is solubilized or degraded by releasing acid from the water-insoluble adsorbent or the generation of acid from the acid generating compound.

In another embodiment of the disclosure, a method of stimulating a subterranean formation is provided wherein an acid soluble or acid degradable solid particulate and an acid liberating or acid generating composite having a water-insoluble adsorbent are pumped into a well. The composite contains an acid adsorbed onto the water-insoluble adsorbent. Alternatively, a compound which generates an acid may be adsorbed onto the water-insoluble adsorbent. At least a portion of the subterranean formation is blocked by the acid soluble or acid degradable solid particulate. A stimulation fluid may then be pumped into the well. The flow of the stimulation fluid is diverted from the blocked portion of the subterranean formation to a second portion of the formation. The permeability of the subterranean formation blocked by the acid soluble or acid degradable solid particulate is greater than the permeability of the second portion of the formation. The solid particulate is solubilized or degraded by releasing acid from the water-insoluble adsorbent or the generation of acid from the acid generating compound.

In another embodiment of the disclosure, a method of increasing the stimulated rock volume (SRV) of a shale formation is provided. In this embodiment, an acid soluble or acid degradable solid particulate and a composite of an acid or an acid generating compound adsorbed onto a water-insoluble adsorbent are pumped into the well. The solid particulate may be alumina, calcium carbonate, benzoic acid, a mineral fiber, sand or a mixture thereof. In an embodiment, the acid of the composite may be citric acid, phosphonic acid, sulfamic acid, adipic acid, formic acid, phosphoric acid, hydrochloric acid, acetic acid and toluene-sulfonic acid, a carboxylic acid or a mixture thereof. In another embodiment, the acid generating compound may be a carboxylic acid ester, an acid anhydride or a lactone. The water-insoluble adsorbent may be activated carbon, silica particulate, precipitated silica, zeolite, diatomaceous earth, ground walnut shells, fuller's earth or an organic synthetic high molecular weight water-insoluble adsorbents or a mixture thereof. At least a portion of the subterranean formation is blocked by the acid soluble or acid degradable solid particulate. A stimulation fluid may then be pumped into the well. The flow of the stimulation fluid may then be diverted from the blocked portion of the subterranean formation to a second portion of the formation. The permeability of the subterranean formation blocked by the acid soluble or acid degradable solid particulate is greater than the permeability of the second portion of the formation. The solid particulate may then be solubilized or degraded by releasing acid from the water-insoluble adsorbent or by the generation of acid from the acid generating compound.

In another embodiment, a method of stimulating a subterranean formation is provided wherein a first stage containing an acid soluble or acid degradable solid particulate is pumped into a well penetrating a subterranean formation. A second stage containing a composite having either an acid or an acid generating compound adsorbed onto a water-insoluble adsorbent is then pumped into the well. Permeability in a first zone within the formation is blocked with the acid soluble or acid degradable solid particulate. A stimulation fluid is then pumped into the well. The flow of the stimulation fluid is diverted to a second zone within the formation. The first zone exhibits a higher permeability than the second zone. The solid particulate is then solubilized or degraded by releasing acid from the water-insoluble adsorbent or by the generation of acid from the acid generating compound. After the second stage, at least one additional stage may be pumped into the well. The additional stage may comprise the composite or the acid soluble or acid degradable solid particulate or both the composite and the acid soluble or acid degradable solid particulate.

In another embodiment, a method of stimulating a subterranean formation is provided wherein a first stage containing a composite having either an acid or an acid generating compound adsorbed onto a water-insoluble adsorbent is pumped into a well penetrating a subterranean formation. A second stage containing an acid soluble or acid degradable solid particulate is then pumped into the well. Permeability in a first zone within the formation is blocked with the acid soluble or acid degradable solid particulate. A stimulation fluid is then pumped into the well. The flow of the stimulation fluid is diverted to a second zone within the formation. The first zone exhibits a higher permeability than the second zone. The solid particulate is then solubilized or degraded by releasing acid from the water-insoluble adsorbent or by the generation of acid from the acid generating compound. After the second stage, at least one additional stage may be pumped into the well. The additional stage may comprise the composite or the acid soluble or acid degradable solid particulate or both the composite and the acid soluble or acid degradable solid particulate.

In another embodiment, a method of stimulating a subterranean formation is provided wherein a first stage comprising an acid soluble or acid degradable solid particulate and a composite of an acid or an acid generating compound adsorbed onto a water-insoluble adsorbent is first pumped into the well. This is followed by a second stage comprising the acid soluble or acid degradable solid particulate. Permeability in a first zone within the formation is blocked with the acid soluble or acid degradable solid particulate. A stimulation fluid is then pumped into the well. The flow of the stimulation fluid is diverted to a second zone within the formation. The first zone exhibits a higher permeability than the second zone. The solid particulate is then solubilized or degraded by releasing acid from the water-insoluble adsorbent or generating acid from the acid generating compound. After the second stage, at least one additional stage may be pumped into the well. This additional stage may comprise the composite or the acid soluble or acid degradable solid particulate or a mixture thereof.

In another embodiment, a method of stimulating a subterranean formation is provided wherein a first stage comprising an acid soluble or acid degradable solid particulate is pumped into a well penetrating the formation. A second stage comprising a composite of an acid or an acid generating compound adsorbed onto a water-insoluble adsorbent and the acid soluble or acid degradable solid particulate is then pumped into the well. Permeability in a first zone within the formation is blocked with the acid soluble or acid degradable solid particulate. A stimulation fluid is then pumped into the well. The flow of the stimulation fluid is diverted to a second zone within the formation. The first zone exhibits a higher permeability than the second zone. The solid particulate is then solubilized or degraded by releasing acid from the water-insoluble adsorbent or by the generation of acid from the acid generating compound. After the second stage, at least one additional stage may be pumped into the well. This additional stage may comprise the composite or the acid soluble or acid degradable solid particulate or a mixture thereof.

Accordingly, the present disclosure includes features and advantages which are believed to enable it to advance methods of stimulation. Characteristics and advantages of the present disclosure described above and additional features and benefits will be readily apparent to those skilled in the art upon consideration of the following detailed description of various embodiments.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular elements and materials. As one skilled in the art will appreciate, different persons may refer to an element and material by different names. This document does not intend to distinguish between elements or materials that differ in name. Also, the terms "including" and "comprising" are used herein and in the appended claims in an open-ended fashion, and thus should be interpreted to mean "including, but not limited to . . . ." Further, reference herein and in the appended claims to elements and components and aspects in a singular tense does not necessarily limit the present disclosure or appended claims to only one such component, materials or aspect, but should be interpreted generally to mean one or more, as may be suitable and desirable in each particular instance.

Further, the terms "first" and "second" to describe a stage should only denote the order of addition of stages introduced into the formation relative to each other or the order of zones treated in a formation. In other words, a first stage is merely penultimate to a second stage and a first zone is merely penultimate to a second zone. Thus, for example, the "first stage" may refer to a third stage of pumping and a "second stage" may refer to a sixth stage of pumping a fluid into a formation; the "first zone" may refer to a be a first zone of a formation and the "second zone" may refer to the second zone of the formation or the "first zone" may actually be the third of the formation and the "second zone" may actually be the fifth zone of the formation. The disclosure recites, for instance, pumping of an acid soluble or acid degradable solid particulate in a first stage and pumping of a composite comprising an acid or an acid generating compound in a second stage. This shall mean that the acid or acid generating compound is pumped in a stage subsequent to the pumping of the stage containing the acid soluble or acid degradable solid particulate.

The method described herein consists of pumping into a well the combination of a solid particulate which is either soluble in an acid or degradable by an acid and a composite having an acid or an acid generating compound adsorbed onto a water-insoluble adsorbent.

The solid particulate and composite may be included in a single pumping stage.

Alternatively, the particulate and composite may be included in separate pumping stages. In the later, the solid particulate may first be pumped into the well followed by pumping of the composite. Alternatively, the composite may first be pumped into the well followed by pumping of the solid particulate. Subsequent to pumping of the second stage, one or more stages may then be pumped into the well. Such successive stages may consist of the particulate and composite in separate stages or in a single stage.

In addition, a first stage comprising the acid soluble or acid degradable solid particulate may be pumped into the well followed by a second stage containing the acid soluble or acid degradable solid particulate and the composite. Alternatively, the first stage pumped into the well may contain the acid soluble or acid degradable solid particulate and the composite. The second stage may contain the acid soluble or acid degradable solid particulate. Subsequent to pumping of the second stage, one or more stages may then be pumped into the well. Such successive stages may consist of the particulate and/or composite being in a separate stage or as separate stages.

Suitable acid soluble or acid degradable solid particulates include alumina; carbonates, such as calcium carbonate; solid carboxylic acids, such as aromatic carboxylic acids like benzoic acid; lactic acid; wollastonite; mineral fibers, such as mineral wool; ceramic fibers; glass fibers; organic fibers, such as aramid, polyethylene, polypropylene and polytetrafluoroethylene; kaolin; mica; talc; feldspar; lime; and silica, including sand, as well as mixtures thereof.

Any acid capable of dissolving or degrading the acid soluble or acid degradable solid particulate and capable of being adsorbed onto the adsorbent may be used. Suitable acids include, for example, citric acid; sulfamic acid; carboxylic acids like adipic acid, formic acid, acetic acid and aminocarboxylic acids (such as those containing from 3 to about 12 carbon atoms); phosphonic acid; phosphoric acid; phosphorous acid; hydrochloric acid; and toluenesulfonic acid and mixtures thereof. The release of acid from the adsorbent is dependent upon in-situ conditions, such as pH, temperature, viscosity changes, etc. When placed into a production well, the adsorbed acid slowly dissolves at a generally constant rate over an extended period of time in aqueous fluids contained within the formation.

As an alternative, an acid generating compound may be adsorbed onto the water-insoluble adsorbent. Acid generated from the acid generating compound solubilizes or degrades the solid particulate.

The acid may be generated after the acid generating compound is removed from the water-insoluble adsorbent or may be generated and released while the acid generating compound is adsorbed on the water-insoluble adsorbent. Suitable acid generating compounds include those which react slowly with water to produce an acid. Typically, the acid generating compound forms no significant amount of acid until it is exposed to formation conditions for a sustained period of time. Generally, temperature and the pH of the environment affect the rate of hydrolysis of the acid generating compound. Useful examples are acid anhydrides, esters or lactones (including γ-butyrolactone).

Suitable ester compounds may be derived from those having one or more carboxylate groups, R—COO—and may include, but are not limited to, diesters, triesters, etc. Where the acid generating compound contains more than one carboxylate group, the carboxylate groups may be mixed, i.e., different substituents. In additional to carbon, hydrogen, and oxygen, the carboxylic acid ester may include heteroatoms, such as S, N, P, B, Si, F, Cl, Br, and I. In an embodiment, the organic acid ester may be a polymeric hydroxycarboxlic acid.

The alcohol from which the ester is derived may contain a substituted or unsubstituted alkyl group. Preferably, the alkyl group has one to about twelve carbon atoms per group. Specific examples of alkyl groups originating from an alcohol include, but are not limited to, methyl, ethyl, propyl, butyl, iso-butyl, 2-butyl, t-butyl, benzyl, p-methoxybenzyl, m-methoxybenxyl, chlorobenzyl, p-chlorobenzyl, phenyl, hexyl, pentyl, etc.

In some embodiments, the ester may be an ester of oxalic acid, malonic acid, succinic acid, malic acid, tartaric acid, citric acid, phthalic acid, ethylenediaminetetraacetic acid (EDTA), nitrilotriacetic acid, phosphoric acid or glycolic acid. Anhydrides of such acids, e.g., 4,4'-oxydiphthalic anhydride, may likewise be used.

Specific examples of suitable ester compounds include, but are not limited to, triethyl phosphate, diethyl oxalate, dimethyl phthalate, dibutyl phthalate, diethyl maleate, diethyl tartrate, 2-ethoxyethyl acetate, ethyl acetylacetate, triethyl citrate, acetyl triethyl citrate, tetracyclohexyl EDTA, tetra-l-octyl EDTA, tetra-n-butyl EDTA, tetrabenzyl EDTA, tetramethyl EDTA, etc. Additional suitable ester compounds are described, for example, in the following U.S. Pat. Nos. 3,990,978; 3,960,736; 5,067,556; 5,224,546; 4,795,574; 5,693,837; 6,054,417; 6,069,118; 6,060,436; 6,035,936; 6,147,034; and 6,133,205.

The water insoluble adsorbent may be any of various kinds of commercially available high surface area materials having the affinity to adsorb the acid. Typically, the surface area of the adsorbent is between from about 1 $m^2/g$ to about 100 $m^2/g$.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The acid or the acid generating compound adsorbed onto the adsorbent may be a liquid or a solid dissolved in a liquid. The adsorption of the acid or the acid generating compound onto the solid adsorbent limits the availability of free acid in water. In addition, the composite itself has limited solubility in water.

The acid soluble or acid degradable solid particulate and the composite may be pumped into the well and/or subterranean formation in a carrier fluid. When the solid particulate and the composite are components of separate treatment fluids, the carrier may be the same or different in the respective treatment fluid.

Suitable carriers include water, salt brine and slickwater. Suitable brines including those containing potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof. The percentage of salt in the brine preferably ranges from about 0% to about 60% by weight, based upon the weight of the water.

A fluid containing the acid soluble or acid degradable solid particulate, a fluid containing the composite or a fluid containing both acid soluble or acid degradable solid particulate and composite may be foamed. In addition, any of such fluids may be gelled or non-gelled. Typically the well treatment fluid containing the acid soluble or acid degradable solid particulate is gelled.

Suitable foaming agents include a hydrocarbon or a gas or liquefied gas such as nitrogen or carbon dioxide. In addition, the fluid(s) may be foamed by inclusion of a non-gaseous foaming agent. The non-gaseous foaming agent may be amphoteric, cationic or anionic. Suitable amphoteric foaming agents include alkyl betaines, alkyl sultaines and alkyl carboxylates, such as those disclosed in U.S. Patent Publication No. 2010/0204069, herein incorporated by reference. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Suitable cationic foaming agents include alkyl quaternary ammonium salts, alkyl benzyl quaternary ammonium salts and alkyl amido amine quaternary ammonium salts.

Suitable gelling agents include such viscosifying agents as viscosifying polymers and viscoelastic surfactants. Fluids containing viscosifying polymers may contain a crosslinking agent though the presence of a crosslinking agent is not required.

Generally, the viscosity of a fluid containing the acid soluble or acid degradable solid particulate, a fluid containing the composite or a fluid containing both the acid soluble or acid degradable solid particulate and composite is greater than or equal to 10 cP at room temperature.

The pH of a fluid containing the acid soluble or acid degradable solid particulate, a fluid containing the composite or a fluid containing both the acid soluble or acid degradable solid particulate may further be adjusted when desired. When adjusted, it typically has a value of about 6.5 or more, 7 or more, 8 or more, 9 or more, between 9 and 14, and, most preferably, between 7.5 and 9.5. The pH may be adjusted by any means known in the art, including adding acid or base to the fluid, or bubbling carbon dioxide through the fluid.

Typically, a fluid containing the composite does not exceed 10 vol. percent composite.

The weight ratio of the acid soluble or acid degradable solid particulate to composite pumped into the well is generally between from about 95:5 to about 50:50, preferably between from about 90:10 to about 75:25.

A fluid containing the acid soluble or acid degradable solid particulate, composite or both acid soluble or acid degradable solid particulate and composite may further contain one or more conventional additives such as fluid loss additives, gel breakers, surfactants, demulsifiers, biocides, mutual solvents, surface tension reducing agents, defoaming agents, demulsifiers, non-emulsifiers, scale inhibitors, gas hydrate inhibitors, enzyme breakers, oxidative breakers, buffers, clay stabilizers, or buffers or a mixture thereof.

Where the fluid is used in an acidizing operation, the fluid may include a corrosion inhibitor, a corrosion inhibitor intensifier, or a combination thereof. The purpose of these additives is to reduce the corrosive effects that the acids may have on the well tubulars. Suitable corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized carboxylic acids (e.g., 4-(t-butyl)-benzoic acid and formic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

After being pumped into the well, the acid soluble or acid degradable solid particulate forms a temporary "plug" or "viscous pill" to one or more high permeability zones of the formation as well as zones of the formation not having been damaged by impediments caused by natural or man-made conditions. Little to no invasion of the well treatment fluid containing the solid particulate occurs into lower permeability zones or damaged zones of the formation. The temporary plug which is formed will have a finite depth of invasion related to pore throat diameter. For a given formation, the invasion depth is directly proportional to the nominal pore throat diameter of the formation. Since varying depths of invasion occur throughout the formation based upon the varying permeability or damage throughout the treated zone, the ability of the acid soluble or acid degradable solid particulates to invade into pore throats is dependent on the difference between pore throat sizing of the damaged and non-damaged formation. Invasion depths will normally be greater in cleaner or non-damaged portions of the formation (larger pore throats) than in the lower permeability or damaged zones (smaller or partially filled pore throats). With a greater depth of invasion in the cleaner sections of the formation, more of the solid particulates may be placed in these intervals.

Thus, the particle size of the acid soluble or acid degradable solid particulates is selected such that the particulates may form a bridge on the face of the rock. Alternatively, the particle size of the particulates may be selected such that they are capable of flowing into the fracture and thereby pack the fracture in order to temporarily reduce the conductivity of at least some of the fractures in the formation. While the size of the particulates may vary, they are preferably of a distribution sufficient to block the penetration of the fluid into the high permeability or non-damaged zones of the formation. Thus, the size of the acid soluble or acid degradable particulates is no less than the fracture which it is intended to block.

The acid soluble or acid degradable particulates may be of any shape. For instance, the particulates may be substantially spherical, such as being beaded, or pelleted. Further, the particulates may be non-beaded and non-spherical such as an elongated, tapered, egg, tear-drop, needle-shaped or oval shaped or mixtures thereof. The particulates may also be fibrous. In an embodiment, the acid soluble or acid degradable particulates may have a shape that is cubic, bar-shaped (as in a hexahedron with a length greater than its width, and a width greater than its thickness), cylindrical, multi-faceted, irregular, or mixtures thereof. In addition, the acid soluble or acid degradable particulates may have a surface that is substantially roughened or irregular in nature or a surface that is substantially smooth in nature. Moreover, mixtures or blends of particulates having differing, but suitable, shapes for use in the disclosed method may further be employed.

The formation of the temporary plug causes a pressure increase and diverts stimulation fluid subsequently pumped into the well into a lower permeability zone or damaged zone of the formation. Such stimulation fluids include fracturing fluids and acidizing fluids. Thus, the acid soluble or acid degradable solid particulate acts as a diverting agent during stimulation of the subterranean formation by diverting the flow of stimulation fluids from a high permeability zone (or highly conductive fracture) to a low permeability zone (or low conductive fracture).

Successive stages of the acid soluble or acid degradable solid particulate and acid or composite may be pumped into the well as well as successive stages of stimulation fluids. For instance, a single stage may consist of pumping the acid soluble or acid degradable solid particulate and the composite into the well to form a temporary plug. This may then be followed by pumping of a stimulation fluid. One or more stages of an acid soluble or acid degradable solid particulate and/or composite may then follow.

Where the solid particulate and the composite are pumped into the well in separate stages, the temporary plug may first be formed by pumping the solid particulate into the well followed by pumping of the composite. After pumping of a first stage of stimulation fluid, another stage containing the solid particulate and/or composite may be pumped into the well prior to pumping of a second stage of stimulation fluid. The process may be repeated as described with well treatment fluid(s) followed by stimulation fluid as desired.

In an embodiment, a well treatment fluid containing the acid soluble or acid degradable solid particulate and the composite may be blended with a stimulation fluid and the blended fluid then pumped into the well.

In another embodiment, the acid soluble or acid degradable solid particulate may a proppant and the well treatment fluid containing the proppant and composite may be pumped at a pressure sufficient to create or enlarge a fracture within the formation. In such a case, the well treatment fluid serves as a stimulation fluid.

In another embodiment where the solid particulate and the composite are in separate fluids, the fluid containing the acid soluble or acid degradable solid particulate (as proppant) may function as a stimulation fluid. The stimulation fluid may first be pumped into the well to create or enlarge a fracture. A fluid containing the composite may then be pumped into the well.

Thus, when used in hydraulic fracturing, the acid soluble or acid degradable solid particulate performs as a diverting agent and may be a component of the hydraulic fracturing fluid or may be pumped into the formation as a component of a separate fluid.

When used in acid fracturing, the acid soluble or acid degradable solid particulate may bridge the flow spaces on the face of the formation and form a relatively impermeable or low permeability filter cake on the face of the formation. It may be desirable to first inject acidizing fluid into the formation followed by pumping of the well treatment fluid defined herein containing the acid soluble or acid degradable solid particulate. The pressure drop though the filter cake increases the flow resistance and diverts subsequently injected fluid to less permeable zones of the formation.

In another embodiment, pumping between stages as defined herein may be separated by a spacer fluid. The spacer fluid typically contains a salt solution such as NaCl, KCl and/or $NH_4Cl$.

In the treatment of a heterogeneous formation, it is often preferred to pump alternating stages using a spacer fluid. For instance, when used in an acid stimulation operation, it may be desirable to alternate the pumping of acid stimulation fluids and well treatment diverting fluids. An exemplary pumping schedule may be (i) pumping an acid stimulation fluid; (ii) optionally pumping a spacer fluid; (iii) pumping the well treatment fluid containing the acid soluble or acid degradable solid particulate and composite; (iv) optionally pumping a spacer fluid; and then repeating the cycle of steps (i), (ii), (iii) and (iv). the acid soluble or acid degradable solid particulate and composite in step (iii) may be pumped into the well in different fluids.

Stress conditions in the well may be altered as fluids more readily flow into less conductive secondary fractures within the formation. This may promote a change in fracture orientation. Alteration of stress conditions within the formation provides greater complexity to the created fracture network, improves the reservoir coverage of the stimulation treatment and/or increases Stimulated Reservoir Volume (SRV).

In an embodiment, the pumping of the stage(s) defined herein followed by the pumping of a stimulation fluid may create at least one secondary fracture in a directional orientation distinct from the directional orientation of the primary fracture. Thus, at some point along the primary fracture the resistance to flow of the viscosity and resultant increased pressure induces the subsequently pumped fluid to be diverted to a new area of the reservoir such that the increase in SRV occurs.

Thus, the methods described herein can be used to extend or increase a fracture profile. In addition, the methods described herein may be used to create a multiple of fractures originating from the original primary fracture wherein each successive stage creates a fracture having an orientation distinct from the directional orientation of the fracture created by the penultimate or previous fracture.

In an embodiment, the flow of fluids pumped into the well subsequent to the formation of the temporary plug may be diverted from highly conductive fractures to less conductive fractures by changing the injection rate and/or viscosity of the fluid into the formation. For instance, a shear thinning fluid may be pumped into the well after the formation of the temporary plug at a reduced injection rate in order to build a sufficiently low shear rate viscosity and provide adequate pressure diversion for the changing fracture orientation created by the secondary fractures. In addition, a reduction in injection rate may contribute to the opening and connecting of secondary fractures.

Upon completion of the stimulation operation or where the temporary "plug" is no longer needed in the operation, the acid soluble or acid degradable solid particulate is solubilized or degraded in-situ by release of the acid from the water-insoluble adsorbent or generation of acid from the acid generating compound. Release of the acid from the water-insoluble adsorbent may occur by increasing the pH in-situ to 5.0 or greater. Typically, the acid generating compound produces acid while the acid generating compound is adsorbed onto the water-insoluble adsorbent. However, the acid generating compound may disassociate from the water-insoluble adsorbent and hydrolysis of the acid generating compound may then occur. The released acid from the water-insoluble adsorbent as well as acid generated from the acid generating compound degrades the particulate or solubilizes the particulate.

The particulates are particularly effective when placed into wells having bottomhole temperatures in excess of 250° F.

The methods described herein may be used in the fracturing of formations penetrated by horizontal as well as vertical wellbores.

The formation subjected to the treatment of the invention may be a hydrocarbon or a non-hydrocarbon subterranean formation. The disclosure has particular applicability to the stimulation of carbonate formations, such as limestone, chalk or dolomite as well as subterranean sandstone or siliceous formations in oil and gas wells, including quartz, clay, shale, silt, chert, zeolite, or a combination thereof.

In another preferred embodiment, the method may be used in the treatment of coal beds having a series of natural fractures, or cleats, for the recovery of natural gases, such as methane, and/or sequestering a fluid which is more strongly adsorbing than methane, such as carbon dioxide and/or hydrogen sulfide.

The methods described herein are especially effective with those subterranean reservoirs having a permeability less than or equal to 1.0 mD and most especially those subterranean reservoirs having a permeability less than or equal to 0.1 mD, including shale formations.

Embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein and the claims.

The methods that may be described above or claimed herein and any other methods which may fall within the scope of the appended claims can be performed in any desired suitable order and are not necessarily limited to any sequence described herein or as may be listed in the appended claims.

What is claimed is:

1. A method of stimulating a subterranean formation penetrated by a well comprising:
   (a) pumping into the well and into a first zone within the subterranean formation (i) an acid soluble or acid degradable solid particulate and (ii) a composite comprising an acid adsorbed onto a water-insoluble adsorbent or an acid generating compound adsorbed onto a water-insoluble adsorbent, wherein the acid soluble or acid degradable solid particulate and the composite are pumped into the well in separate stages;
   (b) blocking permeability in the first zone with the acid soluble or acid degradable solid particulate;
   (c) pumping a stimulation fluid into the well;
   (d) diverting the flow of the stimulation fluid to a second zone within the formation, wherein the permeability of the first zone in step (a) is higher than the permeability of the second zone; and
   (e) solubilizing or degrading the acid soluble or acid degradable solid particulate in the first zone by releasing or generating acid from the water-insoluble adsorbent.

2. The method of claim 1, wherein the acid soluble or acid degradable solid particulate is solubilized or degraded in step (e) at a pH of 5.0 or greater.

3. The method of claim 1, wherein the acid soluble or acid degradable solid particulate is a sphere, needle, fiber or a combination thereof.

4. The method of claim 1, wherein the acid soluble or acid degradable solid particulate is alumina, calcium carbonate, benzoic acid, a mineral fiber, sand or a mixture thereof.

5. The method of claim 4, wherein the acid soluble or acid degradable solid particulate is a mineral fiber and further wherein the mineral fiber is mineral wool.

6. The method of claim 1, wherein the acid adsorbed onto the water-insoluble adsorbent is selected from the group consisting of citric acid, phosphoric acid, sulfamic acid, adipic acid, formic acid, phosphoric acid, hydrochloric acid, acetic acid and toluenesulfonic acid, a carboxylic acid and mixtures thereof.

7. The method of claim 1, wherein the acid generating compound is a carboxylic acid ester, an acid anhydride or a lactone.

8. The method of claim 1, wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

9. The method of claim 1, wherein the composite is pumped into the well in a well treatment fluid and further wherein the amount of composite in the well treatment fluid does not exceed 10 vol. percent.

10. The method of claim 1, wherein the temperature within the well is greater than 250° F.

11. The method of claim 1, wherein the permeability of the subterranean formation is less than or equal to 1.0 mD.

12. The method of claim 11, wherein the subterranean formation is shale.

13. The method of claim 1, wherein the first stage pumped into the well comprises the acid soluble or acid degradable solid particulate and the second stage comprises the composite.

14. The method of claim 13, wherein subsequent to the second stage at least one additional stage is pumped into the well wherein the at least one additional stage comprises the acid soluble or acid degradable solid particulate or the composite or a mixture thereof.

15. The method of claim 1, wherein the first stage pumped into the well comprises the composite and the second stage comprises the acid soluble or acid degradable solid particulate.

16. The method of claim 15, wherein subsequent to the second stage at least one additional stage is pumped into the well wherein the at least one additional stage comprises the composite or the acid soluble or acid degradable solid particulate or a mixture thereof.

17. The method of claim 1, wherein the the first stage pumped into the well comprises the acid soluble or acid degradable solid particulate and the second stage pumped into the well comprise the acid soluble or acid degradable solid particulate and the composite.

18. The method of claim 17, wherein subsequent to the second stage at least one additional stage is pumped into the well wherein the at least one additional stage comprises the acid soluble or acid degradable solid particulate or the composite or a mixture thereof.

19. The method of claim 1, wherein the first stage pumped into the well comprises the acid soluble or acid degradable solid particulate and the composite and the second stage comprises the acid soluble or acid degradable solid particulate, the composite or both the acid soluble or acid degradable solid particulate and the composite.

20. The method of claim 19, wherein subsequent to the second stage at least one additional stage is pumped into the well wherein the at least one additional stage comprises the acid soluble or acid degradable solid particulate or the composite or a mixture thereof.

21. A method of stimulating a subterranean formation penetrated by a well comprising:
(a) pumping into the well and into the subterranean formation (i) an acid soluble or acid degradable solid particulate and (ii) a composite comprising an acid adsorbed onto a water-insoluble adsorbent or an acid generating compound adsorbed onto a water-insoluble adsorbent: adsorbent, wherein the acid soluble or acid degradable solid particulate and the composite are pumped into the well in stages and further wherein either:
 (i) the first stage comprises the acid soluble or acid degradable solid particulate and the second stage comprises the composite;
 (ii) the first stage comprises the composite and the second stage comprises the acid soluble or acid degradable solid particulate;
 (iii) the first stage comprises the acid soluble or acid degradable solid particulate and the second stage comprises the acid soluble or acid degradable solid particulate and the composite; or
 (iv) the first stage comprises the acid soluble or acid degradable solid particulate and the composite and the second stage comprises the acid soluble or acid degradable solid particulate, the composite or both the acid soluble or acid degradable solid particulate and the composite:
(b) blocking at least a portion of the subterranean formation with the acid soluble or acid degradable solid particulate;
(c) pumping a stimulation fluid into the well;
(d) diverting the flow of the stimulation fluid from the blocked portion of the subterranean formation to another portion of the formation, wherein the permeability of the subterranean formation blocked by the acid soluble or acid degradable solid particulate is greater than the permeability of the another portion of the formation; and
(e) solubilizing or degrading the acid soluble or acid degradable solid particulate blocking at least a portion of the subterranean formation by releasing or generating acid from the water-insoluble adsorbent.

22. A method of increasing the stimulated rock volume of a shale formation comprising:
(a) pumping into a well which penetrates the shale formation an acid soluble or acid degradable solid particulate and a composite comprising an acid adsorbed onto a water-insoluble adsorbent or an acid generating compound adsorbed onto a water-insoluble adsorbent wherein the acid soluble or acid degradable solid particulate and the composite are pumped into the well in separate stages:
 (i) the acid soluble or acid degradable solid particulate is alumina, calcium carbonate, benzoic acid, mineral fiber, sand or a mixture thereof;
 (ii) the acid is citric acid, phosphonic acid, sulfamic acid, adipic acid, formic acid, phosphoric acid, hydrochloric acid, acetic acid or toluenesulfonic acid or a mixture thereof;
 (iii) the acid generating compound is a carboxylic acid ester, an acid anhydride or a lactone or a mixture thereof; and
 (iv) the water-insoluble adsorbent is activated carbon, silica particulate, precipitated silica, zeolite, diatomaceous earth, ground walnut shells, fuller's earth or an organic synthetic polymer or a mixture thereof;

(b) blocking at least a portion of the shale formation with the acid soluble or acid degradable solid particulate;
(c) pumping a stimulation fluid into the well;
(d) diverting the flow of the stimulation fluid from the blocked portion of the subterranean formation to another portion of the formation, wherein the permeability of the subterranean formation blocked by the acid soluble or acid degradable solid particulate is greater than the permeability of the another portion of the formation; and
(e) solubilizing or degrading the acid soluble or acid degradable solid particulate by releasing the acid from the water-insoluble adsorbent.

23. The method of claim 22, wherein the temperature within the well is greater than 250° F.

* * * * *